April 1, 1969      W. H. WARD, JR      3,436,328

APPARATUS FOR GAS DETECTION

Filed April 19, 1965

INVENTOR.
WILLIAM H. WARD JR.
BY
*Almon S. Nelson*
ATT'Y.

United States Patent Office 3,436,328
Patented Apr. 1, 1969

3,436,328
APPARATUS FOR GAS DETECTION
William H. Ward, Jr., El Segundo, Calif., assignor to General Monitors, Inc., El Segundo, Calif., a corporation of Connecticut
Filed Apr. 19, 1965, Ser. No. 449,089
Int. Cl. B01k 3/02
U.S. Cl. 204—195                                    6 Claims

ABSTRACT OF THE DISCLOSURE

Apparatus for detecting a gaseous component by dissolving it in an electrolyte and measuring the electrical properties of the electrolyte with the dissolved gas therein. A plurality of electrodes are provided which are contacted by a film of said electrolyte, with electrical characteristic measuring means being connected to said electrodes for measuring the electrical characteristics of said film.

---

Figure 1:
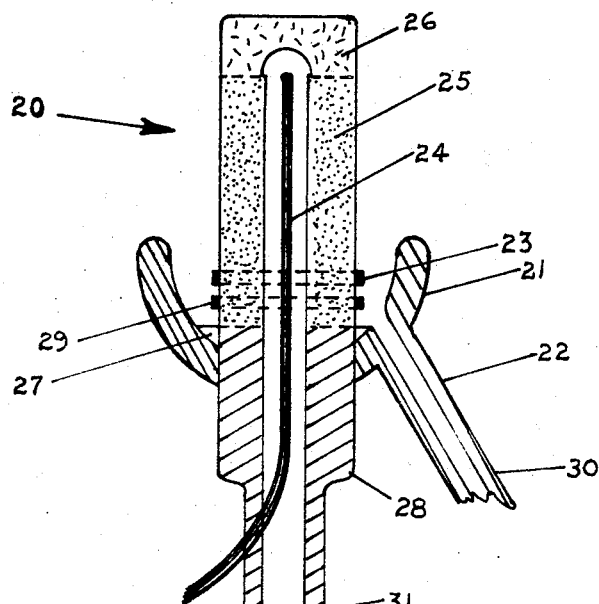

This invention relates to the detection of one gaseous component of a multiple component chemical system, and more particularly to method and apparatus for detecting the presence of a particular gaseous component, by dissolving it in an electrolyte and measuring the electrical properties of this resultant electrolyte with the dissolved gas therein.

There are now on file in the United States Patent Office patents disclosing and claiming inventions relating broadly to the same subject-matter; these patentees have each encountered heretofore some difficulty. Those that have disclosed a device for bubbling the gaseous component through the test solution are: Jacobson, 3,039,053, June 12, 1962; Shaffer, 2,745,804, May 15, 1956; Cruikshank, 2,789,887, Apr. 23, 1957; Axt, 2,863,736, Dec. 9, 1958. All of the above patents are characterized by using a relatively small transfer surface through which a specific volume of gas is absorbed, thus causing the gas to be absorbed at the slowest rate.

Other inventors tried to enhance the rate of absorption of gas into solution by spraying the solution into the gas atmosphere in confinement or by dropping the solution onto a surface in the intimate presence of the gaseous component (such as in Patent No. 2,760,922, Williams, and Patent No. 3,031,272, Agerbek-Poulsen, et al.). These have the shortcoming that the evaporation of the liquid in the presence of the gas leaves salt deposits which eventually causes channelization of the flow of liquid, thereby changing the surface area of the flowing solution which, in turn, changes the relative electrical characteristics of this solution and affects adversely the accuracy of the readings of these electrical characteristics.

There are still other approaches, such as porous or permeable windows, as exemplified by Jacobson et al. in Patent No. 2,795,756 and by Gelman in Patent No. 2,880,071, but in each of these cases the porous window is under the surface of the surrounding liquid.

It is the specific object of the present invention to overcome the above-noted deficiencies with a novel method and apparatus which provides a method of detecting the presence in a gaseous mixture of at least one component by means of measuring various liquid electrolyte test solutions, by measuring the "blocking" action of the hydrogen ion on one of two or more electrodes as an indicator, using a low voltage sensing circuit as a titrating indicator, when the electrolyte solution is forced through a porous surface of a container into uniform intimate efficient contact with the mixture of gases to be tested.

Another object is to provide a novel apparatus and method responsive to one component of a gas mixture, when the mixture is uniformly, intimately, and efficiently placed in contact with a liquid sensing means.

Another object is to provide an apparatus for sensing a particular gas by forcing an electrolyte through a porous member so that by gravity the liquid flows uniformly over two electrodes spaced above a reservoir and a third electrode within the electrolyte source, an amplifier and feed back circuit, associated therewith to impress the desired voltage across two electrodes and a sensing voltage impressed across a third electrode and one of the other two electrodes in order to determine the changes in electrical characteristics of the electrolyte.

Another object is to provide a simple apparatus consisting of a container made with a porous wall wherein the pores are in substantially a surface perpendicular to the force of gravity, when the apparatus is set in the upright position, and those pores at the top are substantantially larger than the remaining portion of the pores of the container and the remaining pores of the container are limited to the vertical surfaces beneath the large pores and adjacent thereto.

Another object of this invention is to provide a method for detecting a particular gas in a liquid solution or in another gas, and quantitatively determining the amount of the gas detected and which method may be performed rapidly and accurately with a simple, inexpensive apparatus.

Another object of this invention includes the provision of apparatus for carrying out the methods indicated in the foregoing objects.

Figure 2:
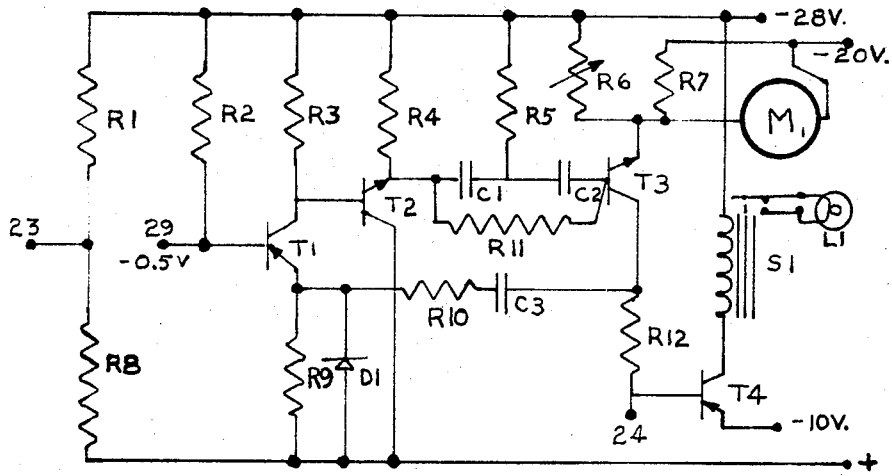

Various other objects and advantages will appear from the following description of one embodiment of the invention, and the novel features will be particularly pointed out hereinafter in connection with the appended claims, taken in conjunction with the accompanying drawings, wherein:

FIG. 1 is an elevational view in partial section of the indicator cell of this invention; and FIG. 2 is a schematic circuit drawing of the power supply and amplifier of this invention.

Referring now to the drawing in detail and to FIG. 1, in particular, a sample of the gas to be analyzed or a sample of gas containing the gaseous component to be determined or sensed is passed around the indicating device, generally shown as 20. This device has a cup or reservoir 21 made of glass, ceramic, or similar impervious material.

The central "fountain" is comprised of a tubular base 28 integral with cup 21, which extends vertically through the bottom of cup 21, and is surrounded at its base by two electrodes 29, 23, in spaced relationship to each other and contacting a portion of the film of electrolyte 27. The upper of the two electrodes 23 is known as the halogen electrode, while the lower electrode 29 is known as the sensing electrode.

Axially located within the tubular base structure 28 is a third electrode 24, known as the hydrogen or reducing electrode. This electrode is surrounded by the inflowing electrolyte for its full length. This electrolyte is contained within the tubular base, and its pervious collar 25, and pervious cap 26. The porosity of the collar and cap are closely controlled to create the flow condition wherein a small percentage of the electrolyte (preferably 2–5%) passes through the pervious collar, and the remaining portion of electrolyte passes through the cap 26, so that it forms a thin annular film of uniform cross-section and surface as it flows downward on the outside of the collar 25, over electrodes 23 and 29 and into cup 21, and joins the residual liquid electrolyte 27.

In operation the electrolyte 27 is forced in tube 31, up tubular base 28 and through pervious collar 25 and cap 26 where it flows down into the cup 21 which acts as a reservoir of the electrolyte 27. The electrolyte may be composed of alkali-like halide solution. Examples of the alkali-like ion would be sodium, potassium, magnesium, and ammonium. Examples of the halide ions would be chloride, bromide, and iodide. Preferably used is a buffered solution of potassium bromide in water of a concentration of .01 molar to .5 molar.

This electrolyte is in contact with three noble metal electrodes, 23, 24, and 29.

Referring to the circuit shown in FIG. 2, this figure shows essentially a power supply, amplifier circuit with a measuring device.

The circuit applies −0.3 to −0.8 volt and in the preferred form −0.5 volt to the sensing electrode 29 with respect to the halogen electrode 23, and then measures the current flow that results between these electrodes. The difference between this current and the desired current is amplified and fed to the hydrogen electrode 24 with respect to the common halogen electrode 23.

The sensing electrode 29 measures the amount of free bromine at its location. The postulated theory is that hydrogen is generated from hydrogen ion by electrolysis but is not given enough energy by the −.5 v. available to escape as a gas from the surface of the platinum and remains absorbed in the surface of the electrode. When the surface of electrode 29 is fully occupied by hydrogen, no more current can flow unless there is some means of removing the molecules of hydrogen and making room for more to be generated by electrolysis. Also, hydrogen in this form is non-conducting at this voltage.

Bromine reacts with hydrogen, providing a means of removing molecules of hydrogen blocking the surface, allowing two electrons to flow for each molecule of hydrogen. The rate of reaction is proportional to the area of electrode and the amount of bromine in solution concentration. Thus, by monitoring the current which flows when .5 v. is applied, an indication of the amount of bromine present is available as "sensing current." Thus, the electrical characteristics or the resistance, or conductance of the electrolyte solution is used to determine the presence of the gaseous component.

At the generation of halogen electrode 23, bromide ion is converted to free bromine by electrolysis. To maintain electrical neutrality in the solution it is necessary to generate an equal amount of hydrogen, which is the purpose of the hydrogen electrode 24. The hydrogen generated is removed by surface evaporation at the surface of collar 25 and cap 26 before it can enter into further reactions.

When power is supplied to the amplifier-cell system, equilibrium is attained through the following series of steps:

First, there is no free bromine in solution since there has been no current; as a result, there is no current between electrodes 23 and 29 because there is no free bromine in the electrolyte solution.

The application of power causes current flow through R2, driving T1, which drives T2, which drives T3, causing current to flow between electrodes 24 and 23, and bromine is generated at electrode 23 and goes into solution. Then current begins to flow between electrodes 23 and 29, by-passing some of the current formerly flowing into the base of T1 from R2, reducing the current in T1, T2, T3, and between electrodes 24 and 23. The rate of generation of free bromine is reduced as a result of the reduction of the current between 24 and 23 and stabilizes at a point determined by the current through R2. The generation current rate adjusts itself to hold the free bromine concentration at a value which allows just enough current to flow between 23 and 29 to equal the current through R2 minus the base current for T1.

If the concentration of bromine rises, more current flows between 23 and 29, reducing the current drive of T1, reducing the generating current between 24 and 23, thus reducing the rate of generation of bromine, and thereby reducing the concentration. If the concentration falls, the opposite occurs, again re-establishing equilibrium.

The compensation circuits consisting of C1, C2, C3, R5 and R10 in the D.C. amplifier correct for time lag in the cell which is mostly due to the time necessary to transport the bromine to the sensing electrode from the generation electrode. The compensation circuit has an output proportional to the rate of change of the input. Several different methods can be used for compensation, of which this is only one. Without compensation, the gain of the amplifier must be reduced or the system will oscillate as is already known in the art.

If cell 20 should run dry for any reason, loss of fluid 27, pump (not shown) failure, or physical damage, then no current will flow between eelctrode 24 and electrode 23. This causes the voltage at 24 to become more negative than −10 volts. Transistor T4 now conducts and pulls in relay S1, which actuates a malfunction warning device, such as a light L1 or a buzzer (not shown) to alert the operator. Thus not only the electrical but the chemical and mechanical functions are monitored by their coaction.

It can now be seen how the cell is used to detect water-soluble gaseous elements of reducing agents such as hydrazine. If the electrolyte flowing across the halide electrode already has hydrazine dissolved in it, any bromine generated reacts with the hydrazine and is reduced to bromide. Not until enough bromine to react with all of the hydrazine, plus enough to cause the equilibrium sensing current to flow, is being generated will the cell be in equilibrium. Effectively, the hydrazine is being titrated with bromine, and the necessary current to generate the bromine is being measured.

The bromine dehydrogenates the hydrazine end of the unsymmetrical dimethyl hydrazine molecule in a fast step, leaving the dimethyl end for a slower oxidation to $CO_2$ which evaporates.

(Fast)
$(CH_3)_2N-NH_2 + Br_2 \longrightarrow (CH_3)_2NH + N_2 + HBr$ (Slow)
$(CH_3)_2NH + Br_2 \longrightarrow CO_2 + HBr + N_2$ The oxidation, or solution, potential of a non-metal in contact with a solution of its ions at 25° C. is expressed by the formula:

$$E = e_0 \frac{-0.0591}{n} \log c$$

where E=E.M.F. in volts; $e_0$=E.M.F. in volts of a solution of normal ion concentration; $n$=valence of the ion; and $c$=concentration of ions in gram ions per liter The potential E increases as the ionic concentration of the solution decreases. When free bromine is present in a solution of bromide ions, there exists a certain definite potential between the molecular bromine and Br-ions which is capable of being measured. This potential is represented by a value which is characteristic for bromine and differs from the potential of other negative ions, e.g., Cl-ions, being lower than the value for the latter ions under equivalent conditions and higher than the value for other non-metallic ions. The actual value thereof depends primarily upon the concentration of bromide ions present, but also is influenced by the simultaneous presence of other ions and by the property of free bromine in aqueous bromide solutions to form complex ions.

It will be understood that various changes in the details, materials, steps, and arrangements of parts, which have been herein described and illustrated in order to explain the nature of the invention, may be made by those skilled in the art within the principle and scope of the invention as expressed in the appended claims.

I claim:

1. A gas detector comprising a first hollow container formed at least partially of pervious material and a second container of impervious material substantially surrounding said first container and forming therewith a liquid reservoir,
   means for passing liquid through the interior of said first container and substantially uniformly through said pervious material to form a film flowing over the outer surface of said pervious material for contact by gas passing thereover,
   means for removing excess liquid from said reservoir,
   first and second electrodes fixedly located on said outer surface of said first container in spaced relationship to each other and in the path of flow of said film,
   a third electrode disposed in said first container and adapted to be contacted by said liquid passing therethrough, circuit means for impressing an electromotive force across said first and third electrodes, and
   electrical characteristic measuring means connected to said first, second, and third electrodes for measuring the electrical characteristics of the gas-absorbed liquid film.

2. The gas detector of claim 1 wherein at least a portion of said pervious material has pores of a greater size than the pores of the remainder of said pervious material.

3. The gas detector of claim 1 wherein said circuit means includes a compensation circuit for correcting the time lag in the detector, the output of said compensation circuit being proportional to the rate of change of the input.

4. The gas detector of claim 1 wherein said circuit means includes amplification means for amplifying the current between said first and third electrodes in proportion to the difference between the current between said first and second electrodes and the desired current.

5. The gas detector of claim 1 further including warning means operatively connected in said circuit means for visually or audibly alerting the operator in response to cessation of liquid flow over said first and second electrodes.

6. A gas detector comprising
   a container of pervious material,
   means for admitting liquid to said container and substantially uniformly through the pores of said pervious material to form a film on one surface of said pervious material,
   means for flowing gas adjacent and in intimate contact with said film,
   means for removing excess gas and liquid from said container, first and second electrodes located on said one surface of said pervious material in spaced relationship to each other and adapted to contact said film,
   a third electrode in said container, circuit means for impressing an electromotive force across said first and third electrodes, and
   electrical characteristic measuring means connected to said first, second, and third electrodes for measuring the electrical characteristics of said liquid film.

References Cited

UNITED STATES PATENTS

| | | | |
|---|---|---|---|
| 1,272,937 | 7/1918 | Fulton | 261—95 |
| 2,551,114 | 5/1951 | Goddard | 261—99 |
| 2,651,612 | 9/1953 | Haller | 204—195 |
| 2,760,922 | 8/1956 | Williams | 204—1.1 |
| 2,912,367 | 11/1959 | Asendorf et al. | 204—1.1 |
| 3,028,317 | 4/1962 | Wilson et al. | 204—1.1 |
| 3,038,848 | 6/1962 | Brewer et al. | 204—195 |
| 3,248,309 | 4/1966 | Robinson | 204—195 |
| 3,316,166 | 4/1967 | Bergson et al. | 204—195 |
| 3,337,440 | 8/1967 | Nestor | 204—195 |

JOHN H. MACK, *Primary Examiner.*

T. TUNG, *Assistant Examiner.*

U.S. Cl. X.R.

204—1; 261—95, 99